(12) United States Patent
Barthelt

(10) Patent No.: US 7,832,515 B2
(45) Date of Patent: Nov. 16, 2010

(54) WHEELCHAIR COMPRISING A REMOTE CONTROL

(76) Inventor: Hans-Peter Barthelt, Hegensbergerstr. 132, Esslingen (DE) 73732

( * ) Notice: Subject to any disclaimer, the term of this patent is extended or adjusted under 35 U.S.C. 154(b) by 270 days.

(21) Appl. No.: 11/795,331

(22) PCT Filed: Jan. 24, 2006

(86) PCT No.: PCT/EP2006/000582

§ 371 (c)(1),
(2), (4) Date: Jul. 16, 2007

(87) PCT Pub. No.: WO2006/084571

PCT Pub. Date: Aug. 17, 2006

(65) Prior Publication Data

US 2008/0115987 A1    May 22, 2008

(30) Foreign Application Priority Data

Feb. 11, 2005    (DE) .................. 10 2005 006 574

(51) Int. Cl.
*B60T 7/16* (2006.01)
(52) U.S. Cl. .................. 180/167; 180/65.51; 180/65.6
(58) Field of Classification Search .............. 180/65.51, 180/65.6, 167, 168, 169, 907, 908
See application file for complete search history.

(56) References Cited

U.S. PATENT DOCUMENTS

| | | | | |
|---|---|---|---|---|
| 4,776,415 A | * | 10/1988 | Brice | 180/11 |
| 5,301,083 A | * | 4/1994 | Grass et al. | 361/64 |
| 5,577,567 A | * | 11/1996 | Johnson et al. | 180/9.23 |
| 6,302,226 B1 | * | 10/2001 | Kanno et al. | 180/6.5 |
| 6,354,390 B1 | * | 3/2002 | Uchiyama et al. | 180/65.1 |
| 6,378,883 B1 | * | 4/2002 | Epstein | 280/250.1 |
| 6,616,505 B1 | * | 9/2003 | Reagan et al. | 446/467 |
| 6,825,765 B2 | * | 11/2004 | Stanley et al. | 340/561 |
| 6,860,347 B2 | * | 3/2005 | Sinclair et al. | 180/11 |
| 6,885,160 B2 | * | 4/2005 | Takeuchi | 318/139 |
| 7,011,172 B2 | * | 3/2006 | Heimbrock et al. | 180/65.51 |
| 2002/0036105 A1 | * | 3/2002 | Birmanns et al. | 180/65.1 |
| 2005/0273920 A1 | * | 12/2005 | Marinas | 4/480 |

FOREIGN PATENT DOCUMENTS

| | | |
|---|---|---|
| DE | 19936137 A1 | 2/2001 |
| DE | 19936137 A1 * | 2/2001 |
| EP | 1092406 A2 | 4/2001 |

OTHER PUBLICATIONS

First Office Action dated Jun. 5, 2009 in Chinese counterpart application 200680004705.4.

* cited by examiner

*Primary Examiner*—J. Allen Shriver, II
*Assistant Examiner*—Erez Gurari
(74) *Attorney, Agent, or Firm*—Leydig, Voit & Mayer, Ltd.

(57) ABSTRACT

A wheelchair having a remote controlled electric drive system so that the user is able to move the wheelchair away or retrieve it without the assistance of another person. The electric drive system includes multiple safety features for precluding hazardous situations that result from accidentally or unintentionally setting the drive system in motion while the wheelchair is occupied.

31 Claims, 3 Drawing Sheets

WHEELCHAIR COMPRISING A REMOTE CONTROL

FIELD OF THE INVENTION

The present invention relates generally to a wheelchair or support structure for assisting movement of a person, and more particularly, to an electric motor driven wheelchair.

BACKGROUND OF THE INVENTION

Persons with limited ability to walk are dependent on wheelchairs. Wheelchairs are required by persons who are no longer able to walk longer distances or are unable to walk at all. However, persons of either group may retain a certain residual mobility that enables them to transfer themselves, e.g., from the wheelchair into a bed or another chair, independently, i.e., without the assistance of another person. This is achieved by moving the wheelchair as close as possible to the piece of furniture in question. After the disabled person has transferred himself from the wheelchair to the other piece of furniture, the wheelchair naturally remains at its original location where it was vacated. This is occasionally quite bothersome.

Similar problems arise if a disabled person transfers himself from the wheelchair and into a vehicle. The wheelchair subsequently must be stowed in the vehicle by means of crane-like apparatuses, or the like.

The wheelchairs used in such instances consist of a chair frame that is constructed with the least weight possible and carry a seating surface and a backrest. Two large running wheels are rotatably supported on the chair frame coaxially with one another. The shafts of these wheels are approximately situated in an extension of the backrest, wherein two small support wheels are provided on the frame at the back of the knees of a user. The support wheels can be passively steered.

The large running wheels simultaneously serve for driving the wheelchair. In this case, the outer side of each wheel is provided with a gripping ring that is connected to the wheel without rotational play. The user takes hold of these rings with his hands in order to set in motion and steer the wheelchair. This type of wheelchair is completely passive or manually operated.

In addition to passive hand-operated wheelchairs, self-propelled wheelchairs have also been introduced into the market. These wheelchairs feature a chassis that is constructed similar to a motor vehicle. The steering wheels and the driving wheels are of approximately the same size and are relatively small in comparison with the wheelchair. The wheelchair furthermore carries an electric drive system and heavy batteries in order to set in motion the wheelchair and its occupant.

OBJECTS AND SUMMARY OF THE INVENTION

It is an object of the invention to provide an improved passive wheelchair that can also be moved by the user after it is vacated.

A passive wheelchair according to the invention has a chair frame that is provided with a seating surface and a backrest. Two large wheels are rotatably supported on the chair frame. These wheels are intended for being set in motion by the user of the wheelchair manually, i.e., by hand. They have conventional gripping rings for this purpose. The wheelchair of the invention furthermore features at least one additional support wheel that is arranged in the region of the front edge of the seating surface. The wheelchair also is provided with an electric drive system in order to move the wheelchair, if so required, away from the location at which it was vacated by the user or back to this location. The drive system comprises a storage battery for electrical energy (rechargeable battery) as well as at least one electric motor. The electric motor is controlled with the aid of a remote control. To this end, the wheelchair has a receiver of the remote control, wherein the at least one motor is connected to the output of this receiver.

According to one embodiment, the drive system exerts a force on the driven wheel, which is less than the force required for moving the wheelchair and its occupant and which serves for moving the wheelchair when not occupied. This ensures that the wheelchair can never be set in motion on a flat surface due to operating errors. The wheelchair still represents a passive wheelchair as soon as a user is seated in it. The rolling resistance generated by the wheelchair and its occupant in this case acts as a brake that cannot be overcome by the drive system as long as the wheelchair is situated on a flat surface.

According to another embodiment, a clutch is provided between the wheel and the drive motor. This clutch is only engaged when the wheelchair is unoccupied. As soon as the user is seated in the wheelchair, the clutch, which is preferably in the form of a positive clutch, is transferred into the disengaged state. This provides the additional advantage that the user does not also have to overcome the resistance of the motor while using the wheelchair.

In this case, it would also be possible to utilize the drive system so that it generates a force on the wheel or wheels that is insufficient to move the occupied wheelchair on a flat surface.

According to a third embodiment, electric switches are provided in the supply line to the drive motor or motors, wherein the switches are automatically switched on or off as a function of the occupied or unoccupied state of the wheelchair. Here, it is ensured that the wheelchair does not carry out any undesirable movements due to operating errors while the user is seated in the wheelchair. A drive system with an appropriate relatively low power rating may also be used in this case.

The very weak power ratings of the drive system are also advantageous in that only a very small electric storage battery is required for effecting the required drive movements. Consequently, the storage battery and the drive system add little additional weight and do not impair the operability of the wheelchair.

It will become apparent that all three variants can be combined with one another in order to realize an extremely safe wheelchair.

The wheelchair preferably is equipped with a sensor in order to detect whether it is occupied or unoccupied. A switchgear or the positive clutch can be actuated with the aid of the sensor. A very simple sensor consists of a movably supported seating surface for effecting the required movement for actuating the clutch or the switchgear.

The entire drive and steering system of the wheelchair can be effected very simply if each wheel is provided with a drive motor. The wheelchair can be freely moved and steered in the unoccupied state by stopping or actuating the respective motor. If the motors rotate in opposite directions, it is possible to turn the wheelchair in place similarly to customary maneuvers of that type manually performed by the user.

An extremely safe operation in the remote-controlled mode can be achieved if each motor is connected to the electric storage battery via two relays. Each of these relays features a movable contact and two stationary contacts. This makes it possible to disconnect all poles of the motor from the energy storage in stop mode. Even if one of the contacts fuses or sticks in the contact position, the motor current is still shut off by the other contact. In addition, this arrangement allows a self-diagnosis because the motor can only turn in one direction of rotation if the contact fuses and the user can immediately detect a dangerous malfunction.

Other objects and advantages of the invention will become apparent upon reading the following detailed description and upon reference to the drawings, in which:

While the invention is susceptible of various modifications and alternative constructions, certain illustrative embodiments thereof have been shown and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
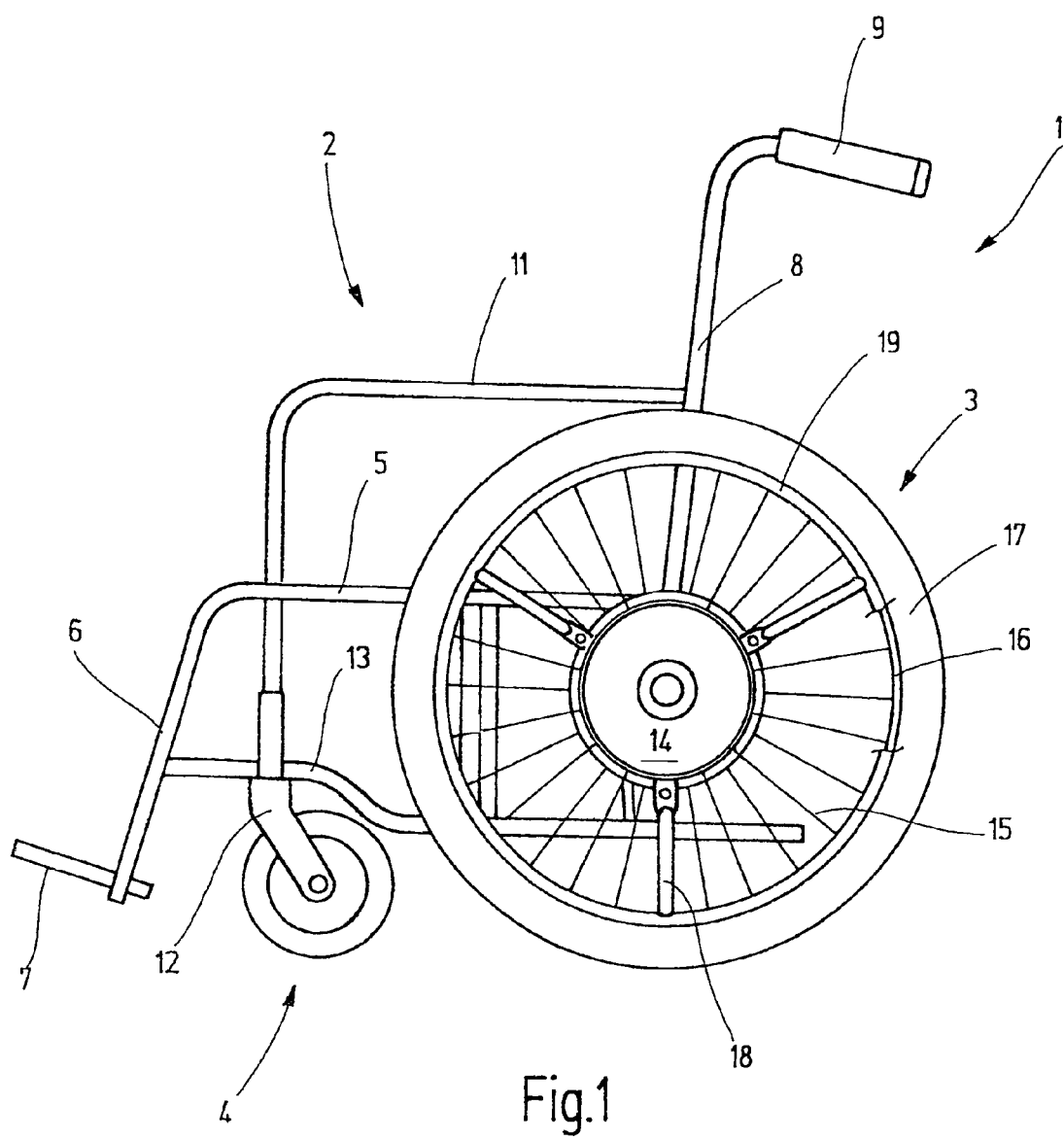
FIG. 1 is a side elevational view of an illustrative wheelchair according to the invention.

Referring now more particularly to FIG. 1 of the drawings, there is shown an illustrative generally passive wheelchair 1 in accordance with the invention. The wheelchair 1 comprises a chair frame 2 of a tubular frame construction. Two large, axially parallel drive wheels 3, as well as two front steering wheels 4, are fixed on the tubular frame 2. Since the figure shows a side view, the wheels on the opposite side are identical and correspond to the wheels 3 and 4 shown.

Two parallel horizontal braces 5 form a support for a seating surface that extends between these braces and in this case, for example, is in the form of a mounted fabric strip. The horizontal brace 5 transitions into an obliquely extending brace 6, on the lower end of which a footrest 7 is fixed. The rear end of each brace 5 is connected to a vertical rear brace 8, on the support free end of which a handle 9 in the form of a push handle is mounted. An additional reinforcement is realized with a brace 11 that simultaneously serves as an armrest. The brace 11 is connected to the rear brace 8 on one end and bent downwardly at its front end. A fork 12 is rotatably fixed on the lower end and serves for accommodating the steering wheel 4 rotatably about a horizontal axis. The fork 12 can be rotated about a vertical axis in order to enable steerability of the wheel 4.

Another brace 13 connects the brace 6 to the lower end of the rear brace 8. An appropriate shaft (not visible in the drawing) for the wheel 3 is provided on the rear brace 8 between the braces 5, 13.

It will be understood that braces that respectively extend parallel to the braces 5, 6, 8, 11, 13 shown in FIG. 1 are provided on the opposite side of the wheelchair 1, wherein the spacing between these braces on the side facing the observer and on the side facing away from the observer corresponds to the width of a person seated in the wheelchair 1. An appropriate backrest also extends between the two rear braces 8.

Each running wheel 3 has a central hub 14 from which wheel spokes 15 extend radially outwardly to a rim 16. A pneumatic tire 17 is conventionally arranged on the rim 16.

On the outer side of the wheel 3, three radially extending braces 18 are arranged on the hub 14 of the wheel and connected to a gripping ring 19 on their outer ends. The gripping ring 19 is spaced apart from the tire 17 and the rim 16 so that the user is able to take hold of the gripping ring in the known way in order to turn the wheels 3 and thereby set the wheelchair 1 in motion.

It will further be understood the wheelchair frame may be assembled to permit folding of the wheelchair when not in use in a convention manner.

The wheelchair 1 described thus far can be used by the user in the known way. The user can be seated between the two armrests 11 on the seating surface extending between the braces 5 with his feet positioned on the footrest 7. The occupied wheelchair can then be pushed by another person or the user is able independently to set the wheelchair in motion. For the latter purpose, the hands of the user can take hold of the gripping rings 19 provided on both sides in order to move the wheels 3. The user is able to steer the wheelchair 1 in the known way by turning the two wheels 3 with different speeds.

Figure 2:
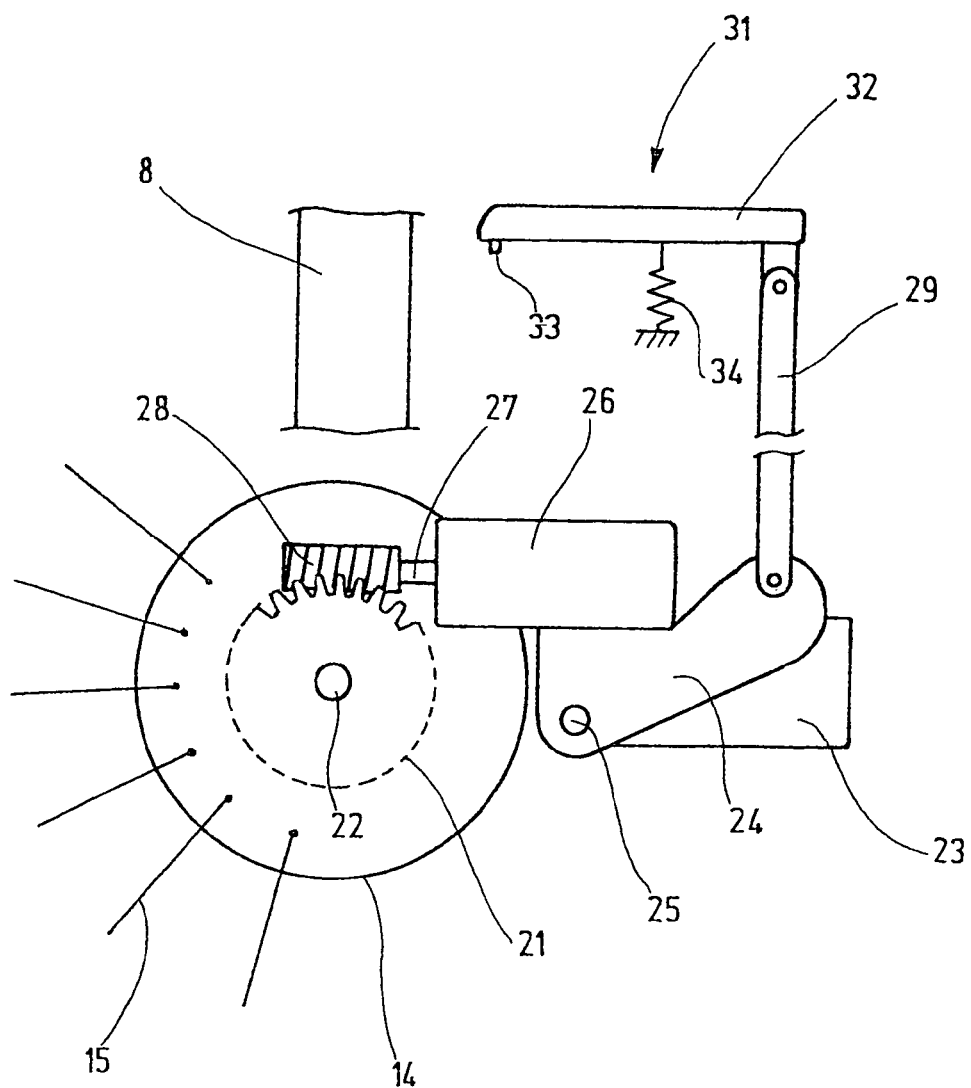
FIG. 2 is a schematic of an electric drive for one of the driven wheels of the illustrated wheelchair.

FIG. 2 shows a schematic representation of an auxiliary devices that make it possible to move the unoccupied wheelchair 1 in remote-controlled fashion. It will be understood that FIG. 2 is not drawn true-to-scale and merely serves to provide a teaching of the invention. A more detailed description of the construction is not required because the construction will be easily understood by a person skilled in the art. Moreover, while FIG. 2 shows a view of the inner side of one of the two wheels 3, the description also applies to the other wheel in a mirror-inverted fashion.

In the illustrated embodiment, as depicted in FIG. 2, a worm gear 21 is coaxially mounted without rotational play on the inner side of the hub 14 that faces the tubular frame 2. The worm gear 21 and the hub 14 are supported to rotate freely on a rigid shaft 22 that is fixed on the rear brace 8. Appropriate ball bearings and the like, as well as the securing devices for axially securing these components to the shaft 22, are omitted from this drawing for clarity since they are not essential for understanding the invention. The diameter of the hub 14 also is illustrated smaller than its actual size in order better to illustrate the essential components.

A rearwardly extending extension arm 23 situated at the height of the shaft 22 originates at the rear brace 8. A one-armed lever 24 is supported on the extension arm 23 for pivotal movement about a shaft 25. The one-armed lever 24 carries a rigidly mounted electric motor 26 having output shaft or armature shaft 27 of which a simplex or multiplex worm 28 is provided without rotational play. The gearing of the worm 28 is designed so that it is able to mesh with the worm gear 21 in a known way. The electric motor 26 consists of a permanently excited DC motor with a nominal supply voltage, for example, of 12 or 24 V.

A link arm 29 connected to the lever 24 a certain distance from the shaft 25 couples the lever 24 to the seating surface 31 of the wheelchair 1. The worm 28 and the connection point of the link arm 29 to the lever 29 are diametrically positioned relative to the axis 25.

The illustrated seating surface 31 may consist, for example, of a fabric that extends between parallel stays 32. The front ends of the stays 32 are supported to pivot between the horizontal stays 5 at 33. The tubular seat stays 32 are prestressed upward by means of a compression spring 34 and in this context, the directional terms refer to the normal operating position.

FIG. 2 shows the unloaded or unoccupied position. In this position, the spring 34 is able to pivot the assigned seat stay 32 upwardly about the center of rotation 33. The link arm 29 transmits the pivoting movement to the lever 24, the rear end of which is also pivoted upwardly. Due to the arrangement of the motor 26 on the lever 24, the latter is pivoted in such a way that the worm 28 engages with the worm gear 21, thereby producing a positive geared connection between the motor 24 and the wheel 3.

Once the user is seated in the wheelchair 1, his body weight presses the seat stays 32 on both sides downwardly, against the force of the spring 34, until they contact appropriate stops (not shown). This causes the levers 24 on both sides of the wheelchair 1 to be pressed downwardly. Thus, in the embodiment shown in FIG. 2, the lever carries out a pivoting movement in the clockwise direction which causes the worm 28 to be disengaged from the worm gear 21.

The worm 28 is located, relative to the pivot axis 25, opposite the connection point of the stay link arm 29 to the lever 24 so that the worm is displaced vertically in an opposite direction relative to the seat stays 32. Such arrangement ensures that the geared connection between the wheel 3 and the motor 26 is interrupted when the wheelchair 1 is occupied.

It will be understood that the arrangement consisting of the link arm 29, the lever 24 and the motor 26 is covered by the hub 14 in FIG. 1, and therefore not visible in that illustration. In FIG. 2, the diameter of the hub 14 is illustrated much smaller than its actual size in order to provide a better overview.

The motor 26 alternatively may be in the form of a gear motor if the gear reduction effected by the worm 28 and the worm gear 21 is insufficient for achieving an appropriately slow speed of the wheelchair 1 while the motor 26 is acted upon with the nominal voltage. In that case, the shaft 27 does not form the armature shaft, but rather the gear output shaft.

Figure 3:
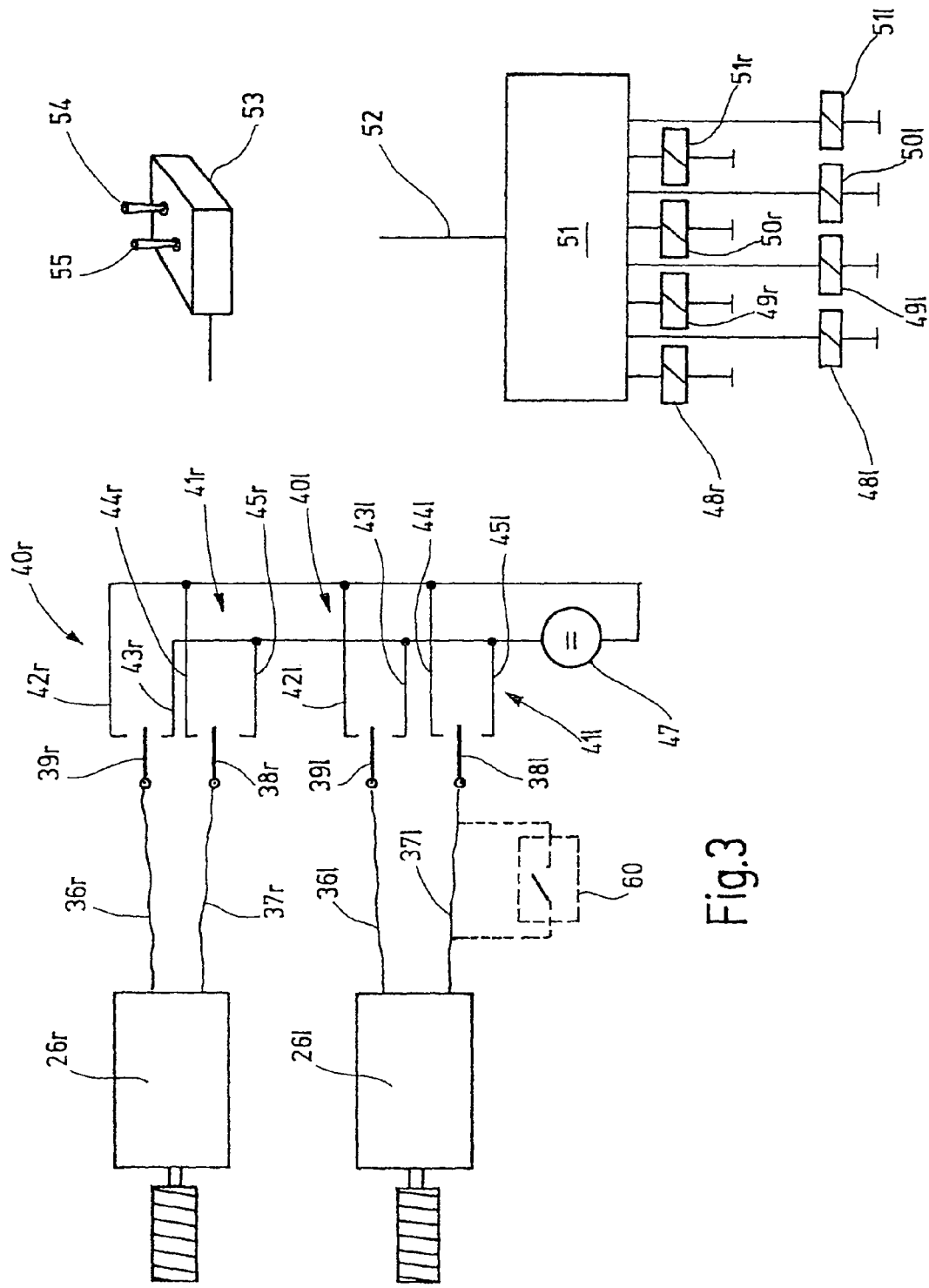
FIG. 3 is a schematic wiring diagram of the wheelchair according to the invention.

A schematic wiring diagram for controlling the motors 26 of the wheelchair 1 of the invention is depicted in FIG. 3. The motors assigned to the two wheels 3 are respectively designated 26r for the right side and 26l for the left side.

The electric terminals 36r, 37r of the motor 26r are connected to the movable contacts 38r, 39r of two separate relays 40r, 41r. The relay 40r also has two stationary contacts 42r, 43r, and the relay 41r has the stationary contexts 44r, 45r. The stationary contacts 42r, 45r are connected to the terminals of a rechargeable battery 47. The motor 26l may be similarly connected to the corresponding relays 40l and 41l. The same reference symbols with the distinguishing suffice ("1" designate the similar components so that a repeated description is unnecessary.

Each relay 40r, 41r, 40l, 41l has magnet windings for control purposes. The magnet windings for the relay 40r are designated by the reference symbols 48r, 49r, the magnet windings for the relay 41r are designated by the reference symbols 50r, 51r, the magnet windings for the relay 40l designated by the reference symbols 48l and 49l, and the magnet windings for the relay 41l are designated by the reference symbols 50l to 51l. The magnet windings 48r, 51l lie at the outputs of a remote-control receiver 51 that is arranged on the wheelchair 1 and receives radio signals via an antenna 52. For example, the movable contact 39r is moved upwardly when the magnet winding 48r is excited. The excitation of the magnet winding 49r causes the movable contact 39r to move downwardly. If the magnet windings 48r, 49r are currentless, the movable contact is in the currentless intermediate position between the two stationary contacts 42r, 43r. This applies analogously to the two other relays.

The radio signals for the remote-control receiver 51 fixed on the wheelchair originate from a portable hand transmitter 53 that has two joysticks 54, 55. The two joysticks 54, 55 are assigned to switches and snap back into the central position when released.

The function of the illustrated arrangement is as follows:

When the user vacates the wheelchair 1, the worm gear pair consisting of the worm 28 and the worm gear 21 engages in the above-described fashion. This means that a geared connection between the wheel 3 and the electric motor 26 is produced on both wheels 3.

The joystick 54 is assigned to the right wheel 3 and the joystick 55 is assigned to the left wheel. When both joysticks 54, 55 are in the central position, the hand transmitter 53 preferably does not transmit a high-frequency signal. Consequently, the receiver 51 receives no signal so that none of the relay windings 48r, 59l is energized by a current. All movable contacts 38r, 39r, as well as moveable contacts 38l, 39l are in the central position, where they do not come in to electric contact with any of the stationary contacts. Both motors 26r, 26l remain without current and therefore do not operate.

For example, if the joystick 55 is moved forwardly by the user attempts to set the left wheel 3 of the wheelchair 1 in forward motion. The hand transmitter 53 transmits a corresponding high-frequency signal that is received by the receiver 51 via its antenna 52. The remote-control receiver 51 evaluates the received signal and causes both magnet windings 48l, 50l to be energized by a current, for example, so that the movable contact 38l comes in contact with the stationary contact 45l and the movable contact 39l is moved to the movable contact 42l, connecting the motor 26 to the battery 47 with the required polarity, so that the motor 26l turns the assigned wheel 3 to produce a forward movement of the wheel.

The same effect is achieved if the user moves the joystick 54 for the right wheel 3 forward. In this case, the transmitted high-frequency signal is also evaluated by the remote-control receiver 51 and the two movable contacts 39r, 38r of the corresponding magnet windings 48r, 50r are moved accordingly.

Since both motors are connected to the same voltage source 47, they turn with the same rotational speed such that the wheelchair 1 moves straight forward if both joysticks 54 and 55 are pushed toward the front. If the user releases one of the two joysticks, the respective motor comes to a standstill and the wheelchair moves along a curve about the idle wheel 3. If both joysticks are actuated in opposite directions, the wheelchair 1 turns in place because one drive wheel 3 rotates backwards as the other drive wheel rotates forwards. If both joysticks 54, 55 are pulled toward the user, the wheelchair 1 moves in reverse.

It can be seen from the foregoing each of the motors 26r, 26l can assume three states. The motor may turn at nominal speed in the direction of rotation that corresponds to the forward movement of the wheelchair or the motor may turn at nominal speed in the direction of rotation that corresponds to the reverse movement, or the motor may be at a standstill. The worm gear pair 21, 28 also forms a type of parking brake while the wheelchair 1 is at a standstill.

Hence, the user of the wheelchair 1 of the invention is able to move the wheelchair 1 to a different location than where it was vacated, or, if so required, the user can return the wheelchair to original location by remote control with the aid of the portable hand transmitter 53.

The nominal speeds of the motors 26, as well as the transmission ratio between the motors and the wheels 3, are chosen such that the wheelchair 1 travels with a manageable speed when the motors operate at nominal speed. Practical speeds can be determined empirically. In other respects, the speeds can be chosen such that the wheelchair 1 cannot tip over about the driven wheels 3 due to the abrupt activation and deactivation of the motors 26.

In addition, the total drive power of the two motors 26r, 26l is selected so that the drive force generated by the motors on the wheels 3 is less than the force resulting from the rolling resistance of the occupied wheelchair 1. This makes it possible to utilize a drive system with very low ratings. Another advantage can be seen, in particular, in that a large electric battery 47 is no longer required. The drive system therefore is very light in weight. The low ratings of the drive train also provide the advantage that the wheelchair 1 cannot be accidentally and unexpectedly set in motion if defects in the mechanical coupling occur in addition to electric malfunctions.

The illustrated electric circuit which includes the relays 40r, 41r, 40l, 41l also ensures that the motor current can be switched off by the other set of contacts of the other relay if one of the contacts fuses in the contacting position. This improves safety in instances in which such fusing of a contact might occur.

It is also possible for the gearing between the motor 26 and the wheel 3 to be designed to be in a constantly engaged condition. In this case, the movable seating surface 31 may be used as a sensor by being coupled to switches that are arranged in the power supply leading to the respective motors 26r, 26l. These switches are schematically indicated with reference symbol 60 in FIG. 3.

It will be understood that the concept of the invention can also be used in connection with walkers or toilet chairs. In that case the wheeled frame of the walker or toilet chairs could be remotely moved similar to that described above.

In the embodiment shown, the worm gear pair 21, 28 is simultaneously used as a positive clutch. However, it would also be possible that the gearing remains constantly engaged and that an axially displaceable claw clutch be utilized instead between the motor 26 and the worm 28.

From the foregoing, it can be seen that the wheelchair of the present invention has a remote-control so that the user is able to move the wheelchair away or retrieve it without the assistance of another person. The required electric drive system includes a multiple safety functions in order to preclude with absolute certainty hazardous situations that result from accidentally or unintentionally setting the drive system in motion while the wheelchair is occupied.

The invention claimed is:

1. A wheelchair (1) for moving a person seated thereon comprising:
a chair frame (2) having wheels (3, 4) that are rotatably supported by said chair frame (2), a seating surface (31) supported on said frame, at least two of said wheels being manually rotatable by a person seated on the wheelchair seating surface for manually moving the wheel chair while occupied with the person seated thereon, an electrical drive system (26, 47) including a storage battery (47) for providing electrical power and at least one electric motor for driving at least one of said wheels (3), said drive system (26, 47) having a power capability for applying force to said at least one driven wheel (3) that is sufficient for moving the wheelchair when unoccupied with no person seated on the seating surface but has insufficient power for moving the wheelchair when occupied by a person seated thereon and supporting the weight of the person, a remote control (40, 41, 51) for remotely controlling operation of said drive system (27, 47) such that the wheelchair may be moved and controlled by the remote-control (40, 41, 51) when unoccupied.

2. The wheelchair according to claim 1, including a controllable clutch (21, 28) arranged between at least one electric motor (26) and said at least one driven wheel (3), and said clutch being disengageable to a disengaged state in response to the weight of a person occupying the wheelchair and engageable to an engaged state when the wheelchair (1) is unoccupied.

3. The wheelchair according to claim 1, including a controllable electric switchgear (60) arranged between the electric motor (26) and the storage battery (47), said switchgear being in a switched off state when the wheelchair (1) is occupied by a person and in the switched-on state when the wheelchair (1) is unoccupied.

4. The wheelchair according to claim 1, including a sensor (31) for detecting whether the wheelchair (1) is occupied by a person or is unoccupied.

5. The wheelchair according to claim 4, including a controllable clutch (21, 28) arranged between at least one electric motor (26) and said at least one driven wheel (3), and said clutch being in a disengaged state when the wheelchair (1) is occupied by a person and in an engaged state when the wheelchair (1) is unoccupied, and said sensor (31) being operable for controlling said clutch (21, 28).

6. The wheelchair according to claim 4, including a controllable electric switchgear (60) arranged between the electric motor (26) and the storage battery (47), said switchgear being in a switched off state when the wheelchair (1) is occupied by a person and in the switched-on state when the wheelchair (1) is unoccupied, and said sensor (31) is operable for controlling said switchgear (60).

7. The wheelchair according to claim 4, in which said seating surface is movably supported, and said sensor (31) is operable in response to movement of said seating surface.

8. The wheelchair according to claim 4, in which said sensor (31) is operable for switching the remote-control receiver (51) on or off.

9. The wheelchair according to claim 2, in which said seating surface (31) is connected to an actuating element (24) of said clutch (21, 28) for controlling the clutch.

10. The wheelchair according to claim 3, in which said seating surface (31) is movably supported and connected to an actuating element of the switchgear (60) for controlling the switchgear (60).

11. The wheelchair according to claim 1 in which said seating surface is part of a toilet chair.

12. The wheelchair according to claim 1 including two said motors (26), one of said motors being operable for driving of one said wheel, and the other said motor being operable for driving another wheel of said wheels.

13. The wheelchair according to claim 1 in which said remote control (40, 41, 51) is operable for switching said motor (26) into three switching states including a first state wherein the power to the motor (26) is switched off, a second state in which the power to the motor is switched on with one polarity, and a third state in which power to the motor is switched to a polarity opposite said one polarity.

14. The wheelchair according to claim 13 in which said remote control (40, 41, 51) includes two relays (40, 41), each said relay having a movable contact (38, 39) that can be selectively brought into electrical contact with one of two stationary contacts (42, 43, 44, 45).

15. A wheelchair (1) for moving a person seated thereon comprising:

a chair frame (2) having wheels (3, 4) that are rotatably supported by said chair frame (2), a seating surface (31) supported on said frame, at least two of said wheels being manually rotatable by a person seated on the wheelchair seating surface for manually moving the wheel chair while occupied with the person seated thereon, an electrical drive system (26, 47) including a storage battery (47) for providing electrical power and at least one electric motor for driving at least one of said wheels (3), a controllable clutch (21, 28) arranged in a drive connection between said electric motor (26) and said at least one driven wheel (3), said clutch being moveable to a disengaged state in response to the weight of a person seated on said seating surface and said clutch being movable to an engaged state when the wheelchair (1) is unoccupied with no person seated on the seating surface, a remote control (40, 41, 51) for controlling the drive system (26, 47) remotely, and said remote control including a remote-control receiver (51) mounted on the wheelchair (1).

16. The wheelchair according to claim 15, including a sensor (31) for detecting whether the wheelchair (1) is occupied by a person or is unoccupied.

17. The wheelchair according to claim 16, in which said sensor (1) is operable for controlling said clutch.

18. The wheelchair according to claim 16, in which said seating surface is movably supported, and said sensor (31) is operable in response to movement of said seating surface.

19. The wheelchair according to claim 16, in which said sensor (31) is operable for switching the remote-control receiver (51) on or off.

20. The wheelchair according to claim 15, in which said seating surface (31) is connected to an actuating element (24) of said clutch (21, 28) for controlling the clutch.

21. The wheelchair according to claim 15, in which said seating surface (31) is movably supported and connected to an actuating element of said clutch for controlling the clutch.

22. The wheelchair according to claim 15 in which said drive system has a power rating such that the force for moving the wheelchair (1) exerted on said at least one said driven wheel (3) is less than the force required for moving the wheelchair while it is occupied by a person.

23. A wheelchair (1) for moving a person seated thereon comprising:

a chair frame (2) having wheels (3, 4) that are rotatably supported by said chair frame (2), a seating surface (31) supported on said frame, at least two of said wheels being manually rotatable by a person seated on the wheelchair seating surface for manually moving the wheel chair while occupied with the person seated thereon, an electrical drive system (26, 47) including a storage battery (47) for providing electrical power and at least one electric motor for driving at least one of said wheels (3), a controllable electric switchgear (60) arranged between the electric motor (26) and the storage battery (47), said switchgear being movable to a switched off state in response to the weight of a person seated on said seating surface and said switch gear being movable to a switched on state when the wheelchair (1) is unoccupied with no person seated on the seating surface, a remote control (40, 41, 51) that serves for controlling the drive system (26, 47) remotely, and said remote control including a remote-control receiver (51) mounted on the wheelchair (1).

24. The wheelchair according to claim 23, including a sensor (31) for detecting whether the wheelchair (1) is occupied by a person or is unoccupied.

25. The wheelchair according to claim 23, in which said sensor is designed for controlling said switchgear.

26. The wheelchair according to claim 24, in which said seating surface is movably supported, and said sensor (31) is operable in response to movement of said seating surface.

27. The wheelchair according to claim 25, in which said sensor (31) is operable for switching the remote-control receiver (51) on or off.

28. The wheelchair according to claim 23, in which said seating surface is movably supported and is connected to an actuating element of the switch gear for controlling the switch gear.

29. A wheeled structure for supporting of the weight of a person for movement during usage comprising:

a frame (2) having wheels (3, 4) that are rotatably supported by said chair frame (2), at least two of said wheels being manually rotatable by a person supported on said chair frame for manually moving the wheel chair while occupied by the person, an electrical drive system (26, 47) including a storage battery (47) for providing electrical power and at least one electric motor for driving at least one of said wheels (3), said drive system (26, 47) having a power capability for applying force to said at least one driven wheel (3) that is sufficient for moving the wheelchair when unoccupied by a person with no weight of the person supported by the frame but insufficient for moving the wheelchair when said frame is supporting the weight of the person during usage, a remote control (40, 41, 51) for remotely controlling operation of said drive system (27, 47) such that the wheelchair may be moved and controlled by the remote-control (40, 41, 51) when not in use by the person.

30. The wheelchair according to claim 29 in which said supporting structure is a toilet chair.

31. The wheelchair according to claim 29 in which said supporting structure is a walker for supporting part of the weight of a person while walking.

* * * * *